US010589461B2

(12) United States Patent
Hikmet et al.

(10) Patent No.: US 10,589,461 B2
(45) Date of Patent: Mar. 17, 2020

(54) METHOD OF USING FDM TO OBTAIN SPECULARLY REFLECTIVE SURFACES

(71) Applicant: SIGNIFY HOLDING B.V., Eindhoven (NL)

(72) Inventors: Rifat Ata Mustafa Hikmet, Eindhoven (NL); Ties Van Bommel, Horst (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/331,566

(22) PCT Filed: Sep. 12, 2017

(86) PCT No.: PCT/EP2017/072932
§ 371 (c)(1),
(2) Date: Mar. 8, 2019

(87) PCT Pub. No.: WO2018/054724
PCT Pub. Date: Mar. 29, 2018

(65) Prior Publication Data
US 2019/0210278 A1    Jul. 11, 2019

(30) Foreign Application Priority Data
Sep. 22, 2016   (EP) .................................. 16190117

(51) Int. Cl.
*B29C 64/165* (2017.01)
*B33Y 80/00* (2015.01)
(Continued)

(52) U.S. Cl.
CPC .......... *B29C 64/165* (2017.08); *B29C 64/118* (2017.08); *B29C 70/585* (2013.01);
(Continued)

(58) Field of Classification Search
CPC ..... F21V 7/22; F21V 7/04; F21V 7/24; B29C 64/165
See application file for complete search history.

(56) References Cited

U.S. PATENT DOCUMENTS 5,867,316 A  *  2/1999  Carlson ................ G02B 5/3008
                                                        359/487.02
9,887,356 B2 *  2/2018  McAlpine ........... H01L 51/0004
(Continued)

FOREIGN PATENT DOCUMENTS

EP       1422268 A2   5/2004
WO   2005057255 A2   6/2005
(Continued)

*Primary Examiner* — Anne M Hines
(74) *Attorney, Agent, or Firm* — Daniel J. Piotrowski

(57) ABSTRACT

A method for 3D printing a 3D item (10), the method comprising providing a filament (320) of 3D printable material (201) and printing during a printing stage said 3D printable material (201) on a substrate (1550), to provide said 3D item (10), wherein the printing stage comprises (a) providing a layer (405) comprising particles (410) on the substrate (1550), wherein the particles (410) have a main axis (A1) having a main axis length (L1), and a minor axis (A2) having a minor axis length (L2), wherein the main axis length (L1) and the minor axis length (L2) have a first aspect ratio of at least 5, wherein in average the main axes (A1) of said particles (410) are configured parallel to a tangential plane (P) to the substrate (1550), wherein said particles (410) comprise light reflective material (411), and (b) printing said 3D printable material (201) on said layer (405) on the substrate (1550) to provide said 3D item (10) comprising said layer (405).

13 Claims, 6 Drawing Sheets

(51) Int. Cl.
    *B33Y 10/00*     (2015.01)
    *B29C 64/118*     (2017.01)
    *B29C 70/58*     (2006.01)
    *B33Y 70/00*     (2020.01)
    *F21V 7/24*     (2018.01)
    *F21V 7/04*     (2006.01)
    *B29L 31/00*     (2006.01)
    *B29K 101/12*     (2006.01)
    *B29K 105/00*     (2006.01)
    *B29L 11/00*     (2006.01)

(52) U.S. Cl.
    CPC ............... *B33Y 10/00* (2014.12); *B33Y 70/00* (2014.12); *B33Y 80/00* (2014.12); *F21V 7/04* (2013.01); *F21V 7/24* (2018.02); *B29K 2101/12* (2013.01); *B29K 2105/251* (2013.01); *B29L 2011/0083* (2013.01); *B29L 2031/722* (2013.01)

(56) References Cited

U.S. PATENT DOCUMENTS

| | | | |
|---|---|---|---|
| 10,377,095 | B2 * | 8/2019 | Manousakis ........... B33Y 30/00 |
| 2014/0291895 | A1 | 10/2014 | Kanade et al. |
| 2015/0014885 | A1 | 1/2015 | Hofmann et al. |
| 2015/0021628 | A1 | 1/2015 | Medendorp et al. |
| 2015/0079327 | A1 | 3/2015 | Kautz et al. |
| 2015/0298393 | A1 | 10/2015 | Suarez |
| 2015/0343673 | A1 | 12/2015 | Williams |
| 2016/0068696 | A1 | 3/2016 | Xu |

FOREIGN PATENT DOCUMENTS

| | | |
|---|---|---|
| WO | 2012166525 A1 | 12/2012 |
| WO | 2015092014 A1 | 6/2015 |

\* cited by examiner

METHOD OF USING FDM TO OBTAIN SPECULARLY REFLECTIVE SURFACES

CROSS-REFERENCE TO PRIOR APPLICATIONS

This application is the U.S. National Phase application under 35 U.S.C. § 371 of International Application No. PCT/EP2017/072932, filed on Sep. 12, 2017, which claims the benefit of European Patent Application No. 16190117.8, filed on Sep. 22, 2016. These applications are hereby incorporated by reference herein.

FIELD OF THE INVENTION

The invention relates to a method for manufacturing a 3D item. The invention also relates to the 3D (printed) item obtainable with said method. Further, the invention relates to a lighting system including such 3D (printed) item.

BACKGROUND OF THE INVENTION

Additive manufacturing parts of optical systems is known in the art. US20150343673 A1, for instance, describes a method of manufacturing an optical-element, comprising (a) printing at least a part of a mold via additive manufacturing technology, (b) depositing a nanocomposite-ink at one or more voxels within the mold, (c) selectively curing the deposited nanocomposite-ink, and (d) repeating at least steps (b) through (d) until the mold is appropriately filled and cured. The mold is made from a plastic. In embodiments, the mold incorporates an optical insert. The optical insert is incorporated during the 3D-printing process. An example of the optical-element is a simple plano-convex lens with plano surface and convex surface.

SUMMARY OF THE INVENTION

Within the next 10-20 years, digital fabrication will increasingly transform the nature of global manufacturing. One of the aspects of digital fabrication is 3D printing. Currently, many different techniques have been developed in order to produce various 3D printed objects using various materials such as ceramics, metals and polymers. 3D printing can also be used in producing molds which can then be used for replicating objects.

For the purpose of making molds, the use of polyjet technique has been suggested. This technique makes use of layer by layer deposition of photo-polymerisable material which is cured after each deposition to form a solid structure. While this technique produces smooth surfaces the photo curable materials are not very stable and they also have relatively low thermal conductivity to be useful for injection molding applications.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Other terms for FDM are "fused filament fabrication" (FFF) or "filament 3D printing" (FDP), which are considered to be equivalent to FDM. In general, FDM printers use a thermoplastic filament, which is heated to its melting point and then extruded, layer by layer, (or in fact filament after filament) to create a three dimensional object. FDM printers are relatively fast and can be used for printing complicated object.

FDM printers are relatively fast, low cost and can be used for printing complicated 3D objects. Such printers are used in printing various shapes using various polymers. The technique is also being further developed in the production of LED luminaires and lighting solutions.

Incorporation of specular reflecting elements in 3D prints is interesting for creating a wide range of decorative effects. On the other hand, specular reflecting 3D prints can be used in functional reflector designs for LED luminaires. However, specular (mirror) effects are hard to make in FDM 3D printing technology. Experiments using aluminum flakes incorporated in the printing filament yields a silverish/grey material with a low reflectivity. Further, one may of course include non-3D printed optical elements in the 3D printed item. However, this may complicate product and does not allow using the 3D printing freedom and opportunities to be applied to the optical element.

Hence, it is an aspect of the invention to provide an alternative optical element, especially a (specular) reflector, which preferably further at least partly obviates one or more of above-described drawbacks. Yet further, it is an aspect of the invention to provide an alternative lighting system comprising such optical element, especially a reflector, which preferably further at least partly obviates one or more of above-described drawbacks. Further, it is an aspect of the invention to provide a method for providing such optical element, especially a reflector, which preferably further at least partly obviates one or more of above-described drawbacks. Furthermore, a 3D printer will be described that can be used to provide a 3D printed object (which can also be indicated as "3D printed item" or "3D item"), which 3D printed object can e.g. be used as optical element.

Here, amongst others it is suggested to bring first a layer of reflective flakes on a (smooth) substrate such as aluminum or a glass substrate. After bringing the flakes onto a (smooth) substrate an object can then be printed on top of the layer of flakes. The object is then removed from the substrate and in this way, a (specularly) reflecting surface with metallic appearance can be obtained on a 3D printed object. Such surface can be functional to produce a reflector or a collimator. However, such surface can also be a decorative surface. The surface of the substrate can be used as a mold for providing the desired surface structure of part of the 3D printed item. With a part of the surface or the entire surface of the substrate that is used as mold being flat, e.g. a specular reflective mirror may be obtained.

Therefore, in a first aspect the invention provides a method for 3D printing a 3D item (herein also indicated as "3D printed item"), the method comprising providing a filament of 3D printable material ("printable material") and printing during a printing stage said 3D printable material on a substrate, especially with a fused deposition modeling (FDM) 3D printer, to provide said 3D item, wherein the printing stage comprises (a) providing a layer (herein also indicated as "functional layer") comprising particles on the substrate, wherein the particles have a main axis (A1) having a main axis length (L1), and a minor axis (A2) having a minor axis length (L2), wherein the main axis length (L1) and the minor axis length (L2) have a first aspect ratio larger than 1, especially at least 5, wherein especially in average the main axes (A1) of said particles are configured parallel to a tangential plane (P) to the substrate, wherein in specific embodiments said particles comprise light reflective material, and (b) printing said 3D printable material on said layer on the substrate to provide said 3D item comprising said layer. Especially, the particles are flakes.

With such method it is amongst others possible to provide a reflective surface, especially a specular reflective mirror, on a 3D printed item or in fact integrated with such 3D printed item. Hence, the invention allows (specularly) reflecting (decorative) surfaces with metallic appearance on 3D printed objects.

As indicated above, the invention thus provides a method comprising providing a filament of 3D printable material and printing during a printing stage said 3D printable material on a substrate, to provide said 3D item. Materials that may especially qualify as 3D printable materials may be selected from the group consisting of metals, glasses, thermoplastic polymers, silicones, etc. Especially, the 3D printable material comprises a (thermoplastic) polymer selected from the group consisting of ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), Polypropylene (or polypropene), Polystyrene (PS), PE (such as expanded-high impact-Polythene (or polyethene), Low density (LDPE) High density (HDPE)), PVC (polyvinyl chloride) Polychloroethene, etc. Optionally, the 3D printable material comprises a 3D printable material selected from the group consisting of Urea formaldehyde, Polyester resin, Epoxy resin, Melamine formaldehyde, Polycarbonate (PC), rubber, etc. Optionally, the 3D printable material comprises a 3D printable material selected from the group consisting of a polysulfone, a polyether sulfone, a polyphenyl sulfone, an imide (such as a poly ether imide) etc.

Herein, the term "3D printable material" may also be indicated as "printable material. The term "polymeric material" may in embodiments refer to a blend of different polymers, but may in embodiments also refer to essentially a single polymer type with different polymer chain lengths. Hence, the terms "polymeric material" or "polymer" may refer to a single type of polymers but may also refer to a plurality of different polymers. The term "printable material" may refer to a single type of printable material but may also refer to a plurality of different printable materials. The term "printed material" may refer to a single type of printed material but may also refer to a plurality of different printed materials.

Hence, the term "3D printable material" may also refer to a combination of two or more materials. In general these (polymeric) materials have a glass transition temperature $T_g$ and/or a melting temperature $T_m$. The 3D printable material will be heated by the 3D printer before it leaves the nozzle to a temperature of at least the glass transition temperature, and in general at least the melting temperature. Hence, in a specific embodiment the 3D printable material comprises a thermoplastic polymer having a glass transition temperature ($T_g$) and/or a melting point ($T_m$), and the printer head action comprises heating the 3D printable material above the glass transition and if it is a semi-crystalline polymer above the melting temperature. In yet another embodiment, the 3D printable material comprises a (thermoplastic) polymer having a melting point ($T_m$), and the printer head action comprises heating the 3D printable material to be deposited on the receiver item to a temperature of at least the melting point. The glass transition temperature is in general not the same thing as the melting temperature. Melting is a transition which occurs in crystalline polymers. Melting happens when the polymer chains fall out of their crystal structures, and become a disordered liquid. The glass transition is a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former.

Specific examples of materials that can be used can e.g. be selected from the group consisting of acrylonitrile butadiene styrene (ABS), polylactic acid (PLA), polycarbonate (PC), polyamide (PA), polystyrene (PS), PET, thermoelastic elastomer, etc.

The printable material is printed on a receiver item. Especially, the receiver item can be the building platform or can be comprised by the building platform. The receiver item can also be heated during 3D printing. However, the receiver item may also be cooled during 3D printing.

The phrase "printing on a receiver item" and similar phrases include amongst others directly printing on the receiver item, or printing on a coating on the receiver item, or printing on 3D printed material earlier printed on the receiver item. The term "receiver item" may refer to a printing platform, a print bed, a substrate, a support, a build plate, or a building platform, etc. Instead of the term "receiver item" also the term "substrate" may be used. The phrase "printing on a receiver item" and similar phrases include amongst others also printing on a separate substrate on or comprised by a printing platform, a print bed, a support, a build plate, or a building platform, etc. Therefore, the phrase "printing on a substrate" and similar phrases include amongst others directly printing on the substrate, or printing on a coating on the substrate or printing on 3D printed material earlier printed on the substrate. Here below, further the term substrate is used, which may refer to a printing platform, a print bed, a substrate, a support, a build plate, or a building platform, etc., or a separate substrate thereon or comprised thereby. See further also below were specific (separate) substrates are discussed.

As further indicated above, the printing stage comprises (a) providing a layer comprising particles on the substrate. Especially, this layer is not provided by 3D printing but by a coating process, such as spin coating, spraying, dip coating, blade coating, etc.

The layer (thus provided) may essentially consist of the particles. However, in embodiments the layer may also comprise other material, such as to facilitate the application of the particles on the substrate. For instance, a liquid carrier may be used for spraying or coating. Material other than the particles may be removed, such as by evaporation.

Further, the particles may comprise coated particles (see also below). In such embodiments, the particles including a coating are applied to the substrate. The layer comprising particles on the substrate may include at least 80% wt. %, or even more especially at least 90 wt. %, yet even more especially at least 95 wt. % of particles and optional coating on particles. The remainder may be solvent, binder, etc.

In yet further embodiments, in addition to the particles described herein for their reflective function, the layer may also include other type of particles. The weight percentage of such particles in the layer is especially less than 20 wt. %, such as less than 10 wt. % in order to maintain the desired reflectivity.

As indicated above, the particles used are specific particles. Due to their properties, the particles may provide a plurality of desired properties. One of these properties is that the particles easily form a flat layer on a flat surface. The particles may align in a substantially 2D arrangement, or even a linear arrangement, with the main axis in parallel planes, or even aligned parallel, respectively. This may lead to a relatively flat layer. This may also lead to relatively specularly reflecting layer (when reflective particles are applied). A random distribution of the particles may not lead to a specular reflective surface, whereas an aligned distribution of reflective particles may lead to a specular reflective surface.

To this end, particles are used which have a main axis (A1) having a main axis length (L1), and a minor axis (A2) having a minor axis length (L2), wherein the main axis length (L1) and the minor axis length (L2) have a first aspect ratio larger than 1, such as at least 2, like in the range of 5-10,000. The use of such particles may thus lead—when depositing to the substrate—to a layer wherein in average the main axes (A1) of said particles are configured parallel to a tangential plane (P) to the substrate (see further also below). The term "in average" especially refers to a number average.

Especially, the particles have a longest axis or main axis and a shortest axis or minor axis, which have a aspect ratio of larger than 1, especially at least 2, such as at least 5, such as in the range of 5-10,000, like even more especially at least 10, such as in the range of 10-10,000, like at least 50, such as in the range of 50-1,000.

In embodiments, the particles have main axis lengths (L1) selected from the range of 1-500 µm, such as 2-100 µm, and minor axis lengths (L2) selected from the range of 5 nm-10 µm, like at least 20 nm (see further also below).

The particles may have a flake like structure, i.e. particles having a maximum width and a maximum length substantially larger than a maximum thickness, such as a first aspect ratio of the maximum length and maximum thickness of especially at least 5, like at least 10, such as in the range of 10-10,000, and/or a second aspect ratio of the maximum width and the maximum height of especially at least 5, such as in the range of 10-10,000.

Further, in embodiments the particles may have a third aspect ratio of the maximum length and maximum width, which is especially larger than 1, such as more especially at least 2, such as at least 5, like at least 10, such as in the range of 10-10,000 (see further also below). Hence, in embodiments the particles are flakes.

The aspect ratios, as indicted above, refer to the particles including an optional coating of the particles. The phrase "coating of the particles" especially refers to a coating on an individual particle, i.e. a coating enclosing a single particle. Hence, also the term "particle coating" may be used. The coating may enclose the particle entirely or only a part of the particle. The particles of a subset of the total number of particles may include a particle coating and anther subset of the total number of particles may not include a particle coating. Further, the aspect ratios indicated above may refer to a plurality of particles having different aspect ratios. Hence, the particles may be substantially identical, but the particles in the coating may also mutually differ, such as two or more subsets of particles, wherein within the subsets the particles are substantially identical.

With such particles, relative flat layers may be provided wherein the particles may substantially be aligned. In specific embodiments, in average the main axes (A1) of said particles have an angle (α) to said tangential plane (P) selected from the range of 0-30°, or even selected from the range of 0-10°, which implies that in average substantially all main axes are essentially parallel to the tangential plane.

To define the main axis and the minor axis or minor axes for the particles, herein the axes of a (virtual) rectangular parallelepiped with the smallest volume that encloses the particle may be used. The main and minor axes are defined perpendicular to the faces of the rectangular parallelepiped, the main axis having a main axis length (L1), a minor axis with a minor axis length (L2) and another or further (orthogonal axis) having a further axis length (L3). Hence, the main axis may especially relate to a length of the particles, the minor axis may especially relate to a thickness or height of the particles, and the further axis may especially refer to a width of the particles.

Especially, L1>L2, further, especially L3>L2. The ratios given herein for L1/L2 may also apply to a ratio of L3/L2. L1 and L3 may be the same or may differ, but are in specific embodiments each individually especially at least 5 times larger than L2, such as at least 10 times larger than L2. Further, the dimensions herein given for the main axis length may thus also apply for the length of the further axis, though—as indicated above—the length of these axis may be chosen individually. With the definition of the virtual) rectangular parallelepiped, and the herein indicated dimensions, essentially flat particles, like flakes, are defined.

Therefore, in embodiments the main axis, the minor axis, and a further axis, define a rectangular parallelepiped with a smallest volume that encloses the particle, wherein the further axis has a further axis length (L3), wherein further axis length (L3) and the minor axis length (L2) have a second aspect ratio (L3/L2) of at least 5, such as at least 10.

Hence, note that one of the minor axes may also be essentially parallel to the tangential plane, such as in average (also) having an angle to said tangential plane (P) selected from the range of 0-30°, or even selected from the range of 0-10°.

Further, the particles may mutually differ. For instance, the particles may have a distribution of the sizes of one or more of the main axis, the minor axis (and the further axis). Therefore, in average, the particles will have dimensions as described herein. For instance, at least 50 wt. % of the particles comply with the herein indicated dimensions (including ratios), such as at least 75 wt. %, like at least 85 wt. %. As known in the art, the particles may also have effective diameters indicated with d50. Such diameters may thus vary, as there may be a distribution of particle sizes.

Hence, in embodiments at least 50 wt. % of the particles, such as at least 75 wt. %, like at least 85 wt. % has a main axis with a length (L1) selected from the range of 1-500 µm, such as 2-100 µm. Yet further, in embodiments at least 50 wt. % of the particles, such as at least 75 wt. %, like at least 85 wt. % has a minor axis length (L2) selected from the range of 5 nm-10 µm, like at least 20 nm, such as in the range of 20-500 nm. Yet further, in embodiments at least 50 wt. % of the particles, such as at least 75 wt. %, like at least 85 wt. % has a further axis with a further axis length (L3) selected from the range of 1-500 µm, such as 2-100 µm. In yet further embodiments, for at least 50 wt. % of the particles, such as at least 75 wt. %, like at least 85 wt. %, apply all these conditions for L1, L2 and L3 for each particle (of the at least 50 wt. %).

In specific embodiments, a mass median weight (or more) of the particles has a main axis with a length (L1) selected from the range of 1-500 µm, such as 2-100 µm. In yet further specific embodiments, a mass median weight (or more) of the particles has a minor axis length (L2) selected from the range of 5 nm-10 µm, like at least 20 nm, such as in the range of 20-500 nm. In further specific embodiments, a mass median weight (or more) of the particles has a further axis with a further axis length (L3) selected from the range of 1-500 µm, such as 2-100 µm. In yet further embodiments, a mass median weight (or more) of the particles comply with all these conditions for L1, L2 and L3.

For particles that have a shape, like a flake-like shape that is essentially cylindrical shape, the main axis and further axis may essentially have the same dimensions, i.e. L1≈L3.

The flakes, as mentioned herein, may have any shape. An example of particles with a high aspect ratio are cornflake particles. Cornflake particles are high aspect ratio flakes with ragged edges and a cornflake-like appearance. Cornflake particles may have aspect ratios in the range of 10-1.000. Another example of particles with a high aspect ratio (i.e. flakes) is the so-called silver dollar particles (or pigments). Dollar particles have high aspect ratios and regular smooth rounded edges. Silver dollar shaped particles may (also) have aspect ratios in the range of 10-1.000. For example, such particles may have a thickness of about 1 µm and a particle size of about 50 µm. Yet a further example of particles with high aspect ratio are PVD (physical vapor deposition) flakes. Physical vapor deposition flakes have very high aspect ratios typically in the range of 100-10.000. The particle may be very thin and may have a thickness which is typically in the range of 30 to 100 nm. The particles size can be in the range of 10-1000 µm. PVD flakes may especially show a high specular reflectivity, such as (even) higher than of cornflake or silver dollar particles. Such PCD flakes may e.g. be aluminum flakes. PVD aluminum flakes may have a mass median diameter of 100 µm, and a mass median height of 50 nm.

The particles, including the optional coating of the particles, may have one or more (intrinsic) properties. The particles may comprise a reflective material. The particles may comprise a luminescent material, for instance the particles might comprise a dye and/or an inorganic phosphor. In this way, highly reflective colored coatings can be made. The particles might also comprise a dichroic coating layer. In this way, angle dependent reflection can be obtained. The particles might also comprise thermal conductive particles. For example, the particles have a thermal conductivity of at least 50 $Wm^{-1}K^{-1}$. More preferably, at least 80 $Wm^{-1}K^{-1}$. Most preferably at least 100 $Wm^{-1}K^{-1}$. For example, the particles are made of aluminum and/or copper. For example, the thermal conductivity of aluminum is about 200 $Wm^{-1}K^{-1}$. The thermal conductivity of copper is about 400 $Wm^{-1}K^{-1}$. The particles might also comprise electrical conductive particles. For instance, the particles may essentially consist of one or more of silver, copper and gold, etc. The particles, including the optional coating of the particles may also include a plurality of different properties, like being colored and being reflective. For instance, a reflective particle may further comprise a light transmissive colored particle coating layer. In specific embodiments, the particles comprise light reflective material. The terms "coating" or "particle coating" may also refer to a plurality of different coatings, such as a multi-layer coating. Hence, in embodiments the particles comprise a coating, especially a light reflective coating. For bringing the particles on a surface they are especially provided as a liquid, such as a solution or a suspension, more especially including a binder so that after bringing them on a surface they preferentially form a layer.

In specific embodiments, the particles comprise one or more of metal particles, inorganic particles, and polymer particles. Such particles may provide reflective properties. Inorganic and polymer particles maybe e.g. particles, such as flakes, having a coating, such as a coating with a reflective metal (layer), like multi-layer coatings. Polymer particles may be PET (particles) with a metallic coating, sometimes referred to as "Glitter". It can also be multi-layer reflective materials. It can also be mica or glass particles with a coating. Other type of materials that may be use may e.g. include aluminum, zinc, gold bronze, nickel, and stainless steel, etc., either as particle material and/or as coating material. In yet further specific embodiments, the particles comprise vacuum-metalized aluminum particles. Hence, the particles may comprise such metals as coating or the particles may essentially consist of such material(s). As indicated above, also combinations of different type of particles may be used. Further, as indicated above in embodiments the particles comprise a (metallic) coating. The particles may thus provide a specific function to the layer, which layer is herein also indicated as "functional layer".

The substrate used may e.g. provide a metallic surface or a glass surface, especially a surface that includes substantially flat parts. The substrate may be the printing platform, or an item on the printing platform (see also above). In embodiments, the substrate may include a coating for facilitating removal of the said 3D item comprising said layer and/or for increasing the flatness of the substrate. Especially, the substrate comprises a face on which the layer may be deposited, of which at least a part, such as a part of at least 1 $mm^2$, such as at least 4 $mm^2$, has a route mean square surface roughness ($R_{RMS}$ or $R_q$) of at maximum 1 µm, such as at maximum 100 nm, like at maximum 25 nm, such as at maximum 15 nm.

On a macroscopic scale, the surface of the substrate is not necessarily flat, as also shaped specular reflective layers may be provided (see also below). For instance, parabolic reflectors are known which include facetted surfaces; the facets may essentially be flat, but the overall shape is. However, the surface of the surface may also be smoothly curved. For this reason, the tangential plane is used. The deposition of the herein defined particles provides a layer wherein in average the main axes (A1) of said particles are configured parallel to a tangential plane (P) to the substrate. Hence, the phrase "wherein in average the main axes (A1) of said particles are configured parallel to a tangential plane (P) to the substrate" may also refer to a plurality of parts of the layer wherein the particles in such parts are in average with the main axis configured parallel to a tangential plane to such part.

Therefore, in specific embodiments the substrate may have the shape of a reflector with one or more of curved face, a facetted face, and faces configured relative to each under an angle. More precisely, the substrate may have the shape of a mold, on which in embodiments the layer may be provided, wherein especially in average the main axes (A1) of said particles are configured parallel to a tangential plane (P) to the substrate. Hence, in embodiments the substrate may have a convex surface or a facetted convex surface, etc.

The layer (thus provided) may have a layer thickness selected from the range of 5 nm-500 µm, such as 20 nm-200 µm, like 50 nm-1000 µm. The layer (thus provided) has a flatness essentially imposed by the flatness of the substrate, see also below.

Hence, the method further comprises (b) printing said 3D printable material on said layer on the substrate to provide said 3D item comprising said layer. The 3D printing of the printable material may amongst others be executed as described above, especially with the fused deposition modeling method. In specific embodiments, the 3D printable material (and thus 3D printed material) comprises one or more of acrylonitrile butadiene styrene (ABS), polyphenyl sulfone (PPSF), polycarbonate (PC), Polyethyleneteleptha-late (PET), Polymethylmethacrylate (PMMA, etc. After 3D printing, the 3D printed item, including the (functional) layer can be removed from the substrate, providing the 3D printed item including the (functional) layer. The reflective layer is preferentially sprayed onto the substrate from a suspension, especially containing a material with polar and a-polar groups which also helps to suspend the particles and help them align parallel to the surface. The suspension (or other liquid), may especially also contain binder material, such as acrylics, which may hold the particles together. The substrate may especially be chosen such that the layer does not have groups which bond chemically or diffuse into the reflective layer.

Further, the invention relates to a software product that can be used to execute the method described herein.

The herein described method provides 3D printed items. Hence, the invention also provides in a further aspect a 3D printed item obtainable with the herein described method. Especially, the invention provides a 3D printed item comprising 3D printed material and a (reflective) layer, especially a specular reflective layer, on at least part of said 3D printed material, wherein the 3D printed material in specific embodiments comprises a thermoplastic material, wherein the ((specular) reflective) layer comprises particles, wherein the particles have a main axis (A1) having a main axis length (L1), and a minor axis (A2) having a minor axis length (L2), wherein the main axis length (L1) and the minor axis length (L2) have a first aspect ratio larger than 1, wherein in specific embodiments in average the main axes (A1) of said particles are configured parallel to a tangential plane (P) to the ((specular) reflective) layer, and wherein especially said particles comprise light reflective material.

Some specific embodiments in relation to the 3D printed item have already been elucidated below when discussing the method. Below, some specific embodiments in relation to the 3D printed item are discussed in more detail.

As indicated above, essentially flat layers may be provided due to the use of particles having a large first aspect ratio. This leads to particles of which the main axes may essentially be aligned. The alignment can be defined to a tangential plane. This tangential plane can be related to the substrate when the layer is (still) on the substrate. However, this tangential layer may also be related to an upper layer of the 3D printed item to which the layer is associated, or to the layer itself. Hence, the tangential plane is herein also defined in related to the layer on the 3D printed item. Therefore, in specific embodiments in average the main axes (A1) of said particles are configured parallel to a tangential plane (P) to the layer.

In yet a further specific embodiment of the 3D printed item, the particles have a first aspect ratio of at the main axis and the minor axis of least 10. Yet further, in embodiments the layer may have a layer thickness (d1) selected from the range of 5 nm-2 mm, such as 50 nm-1 mm. Also, in embodiments the particles may have main axis lengths (L1) selected from the range of 1-500 µm and minor axis lengths (L2) selected from the range of 5 nm-10 µm. Hence, in embodiments at least 80% of a surface area of the layer has a route mean square surface roughness ($R_{RMS}$ or $R_q$) of at maximum 1 µm, such as at maximum 100 nm, like at maximum 25 nm, such as at maximum 15 nm.

In yet further embodiments, in average the main axes (A1) of said particles have an angle (α) to said tangential plane (P) selected from the range of 0-30° (see also above). In yet further specific embodiments, the particles comprise one or more of metal particles and white particles (see further also above).

The (with the herein described method) obtained 3D printed item may be functional per se. For instance, the 3D printed item may be a lens, a collimator, a reflector, etc. The thus obtained 3D item may (alternatively) be used for decorative or artistic purposes. The 3D printed item may include or be provided with a functional component. The functional component may especially be selected from the group consisting of an optical component, an electrical component, and a magnetic component. The term "optical component" especially refers to a component having an optical functionality, such as a lens, a mirror, a light source (like a LED), etc. The term "electrical component" may e.g. refer to an integrated circuit, PCB, a battery, a driver, but also a light source (as a light source may be considered an optical component and an electrical component), etc. The term magnetic component may e.g. refer to a magnetic connector, a coil, etc. Alternatively or additionally, the functional component may comprise a thermal component (e.g. configured to cool or to heat an electrical component). Hence, the functional component may be configured to generate heat or to scavenge heat, etc.

In specific aspects however, the 3D printed item may be provided as reflector. In such embodiments, the substrate used has a shape of a reflector on which the layer has been provided first, and thereafter on the layer the 3D printed material has been provided. Therefore, the invention also provides a reflector comprising a reflective surface, especially a specular reflective surface, wherein the reflector comprises the 3D printed item as defined herein, and wherein at least part of the reflective surface is provided by said reflective layer, especially said specular reflective layer. As indicated above, in embodiments the reflective surface comprises one or more of a curved face, a facetted face, and faces configured relative to each under an angle. In embodiments, the reflector is a collimator or a parabolic mirror. Hence, types of reflectors include but are not limited to ellipse shaped reflectors (e.g. for converging rays), parabola shaped reflectors (e.g. for making parallel rays), hyperbola-shaped reflectors (for diverging rays), etc.

The reflector may also be used in a lighting system. Hence, the invention provides in yet a further aspect a lighting system comprising (a) a light source configured to generate light source light and (b) a reflector as defined herein configured to (specularly) reflect at least part of said light source light.

Returning to the 3D printing process, a specific 3D printer may be used to provide the 3D printed item described herein. An example of such a specific printer is a fused deposition modeling 3D printer, comprising (a) a printer head comprising a printer nozzle, and (b) a filament providing device configured to provide a filament comprising 3D printable material to the printer head, wherein the fused deposition modeling 3D printer is configured to provide said 3D printable material to a substrate. In specific embodiments, the fused deposition modeling 3D printer further comprises (c) a coating applicator configured to apply a layer to said substrate. Alternatively or additionally, the printer head may include a printer nozzle that is movable in a z-direction. Yet alternatively or additionally, the printer head includes a printer nozzle opening configured under an angle (i.e. the printer nozzle opening is configured such, that printable material may leave the nozzle opening in a direction different from a vertical.

Instead of the term "fused deposition modeling (FDM) 3D printer" shortly the terms "3D printer", "FDM printer" or "printer" may be used. The printer nozzle may also be indicated as "nozzle" or sometimes as "extruder nozzle".

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Figure 1A:
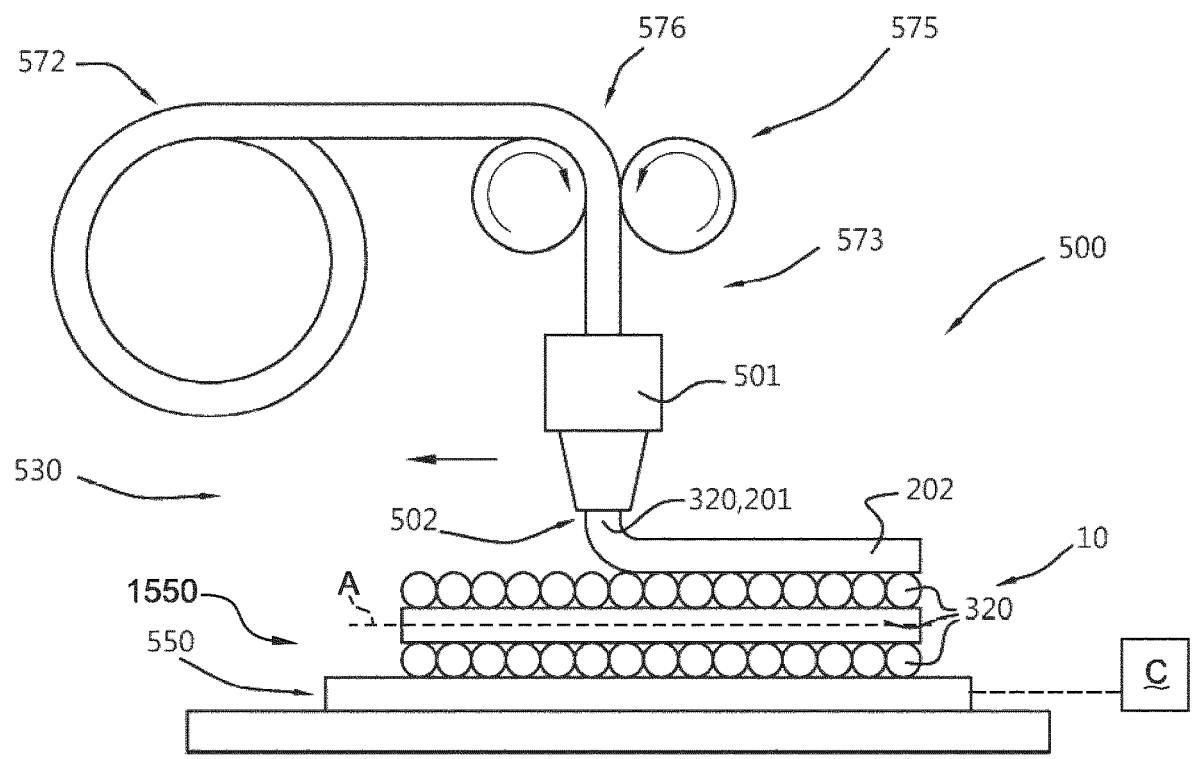
FIGS. 1a-1b schematically depict some general aspects of the 3D printer.

FIG. 1a schematically depicts some aspects of the 3D printer. Reference 500 indicates a 3D printer. Reference 530 indicates the functional unit configured to 3D print, especially FDM 3D printing; this reference may also indicate the 3D printing stage unit. Here, only the printer head for providing 3D printed material, such as a FDM 3D printer head is schematically depicted. Reference 501 indicates the printer head. The 3D printer of the present invention may especially include a plurality of printer heads, though other embodiments are also possible. Reference 502 indicates a printer nozzle. The 3D printer of the present invention may especially include a plurality of printer nozzles, though other embodiments are also possible. Reference 320 indicates a filament of printable 3D printable material (such as indicated above). For the sake of clarity, not all features of the 3D printer have been depicted, only those that are of especial relevance for the present invention (see further also below).

The 3D printer 500 is configured to generate a 3D item 10 by depositing on a receiver item 550, which may in embodiments at least temporarily be cooled, a plurality of filaments 320 wherein each filament 20 comprises 3D printable material, such as having a melting point $T_m$. The 3D printer 500 is configured to heat the filament material upstream of the printer nozzle 502. This may e.g. be done with a device comprising one or more of an extrusion and/or heating function. Such device is indicated with reference 573, and is arranged upstream from the printer nozzle 502 (i.e. in time before the filament material leaves the printer nozzle 502). The printer head 501 may (thus) include a liquefier or heater. Reference 201 indicates printable material. When deposited, this material is indicated as (3D) printed material, which is indicated with reference 202.

Reference 572 indicates a spool or roller with material, especially in the form of a wire. The 3D printer 500 transforms this in a filament or fiber 320 on the receiver item or on already deposited printed material. In general, the diameter of the filament downstream of the nozzle is reduced relative to the diameter of the filament upstream of the printer head. Hence, the printer nozzle is sometimes (also) indicated as extruder nozzle. Arranging filament by filament and filament on filament, a 3D item 10 may be formed. Reference 575 indicates the filament providing device, which here amongst others include the spool or roller and the driver wheels, indicated with reference 576.

Reference A indicates a longitudinal axis or filament axis.

Reference C schematically depicts a control system, such as especially a temperature control system configured to control the temperature of the receiver item 550. The control system C may include a heater which is able to heat the receiver item 550 to at least a temperature of 50° C., but especially up to a range of about 350° C., such as at least 200° C.

Figure 1B:
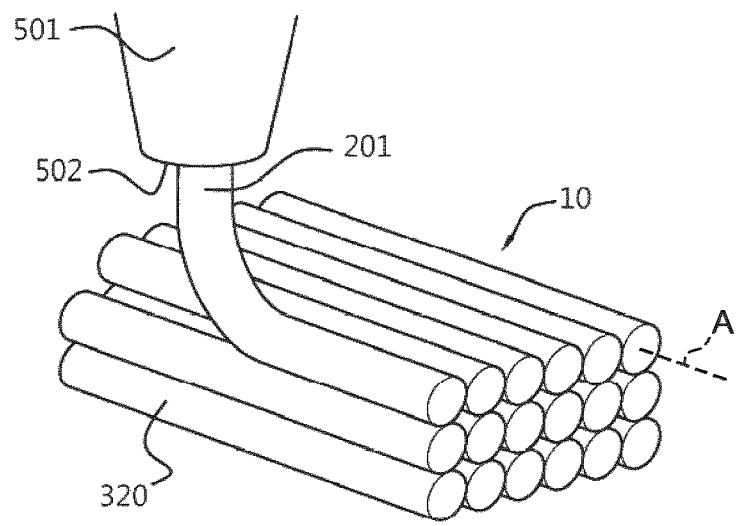

FIG. 1b schematically depicts in 3D in more detail the printing of the 3D item 10 under construction. Here, in this schematic drawing the ends of the filaments 320 in a single plane are not interconnected, though in reality this may in embodiments be the case.

Hence, FIGS. 1a-1b schematically depict some aspects of a fused deposition modeling 3D printer 500, comprising (a) a first printer head 501 comprising a printer nozzle 502, (b) a filament providing device 575 configured to provide a filament 320 comprising 3D printable material 201 to the first printer head 501, and optionally (c) a receiver item 550. In FIGS. 1a-1b, the first or second printable material or the first or second printed material are indicated with the general indications printable material 201 and printed material 202.

Figure 2A:
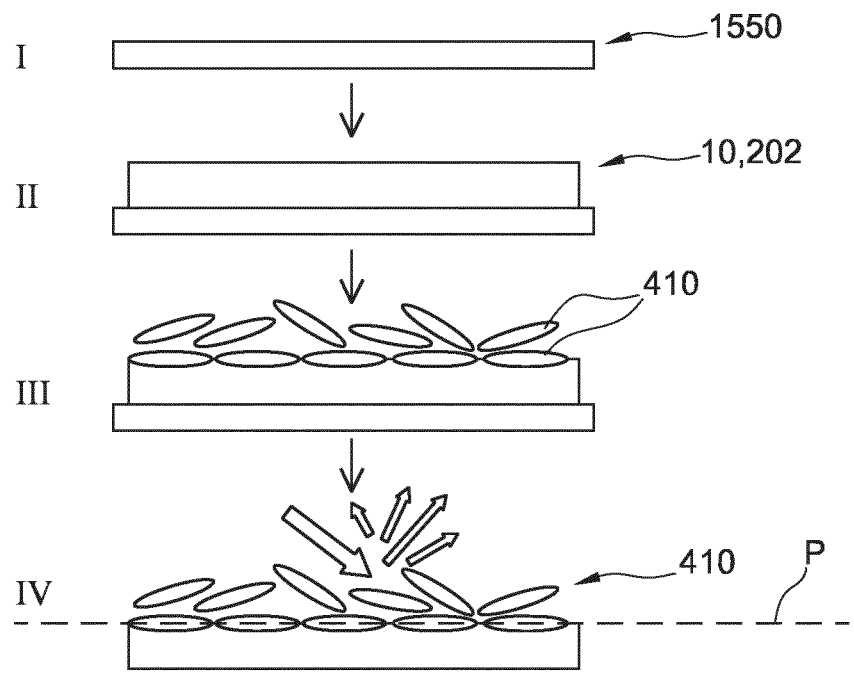
FIGS. 2a-2b schematically depict options to provide a 3D printed item with a functional layer.

It is desirable to add functional coatings to the objects during printing such as specularly reflecting layers, see FIG. 2a. Such layers can be brought on top of the printed object (FIG. 2a: I and II). However, the appearance of the layer on the outer surface looks diffuse and has low reflectivity (FIG. 2a: IV). In FIG. 2a, lowest graph (IV), the top surface is not specularly reflective because of disorientation of the flakes. However, on the bottom surface flakes may be planarly oriented.

Figure 2B:
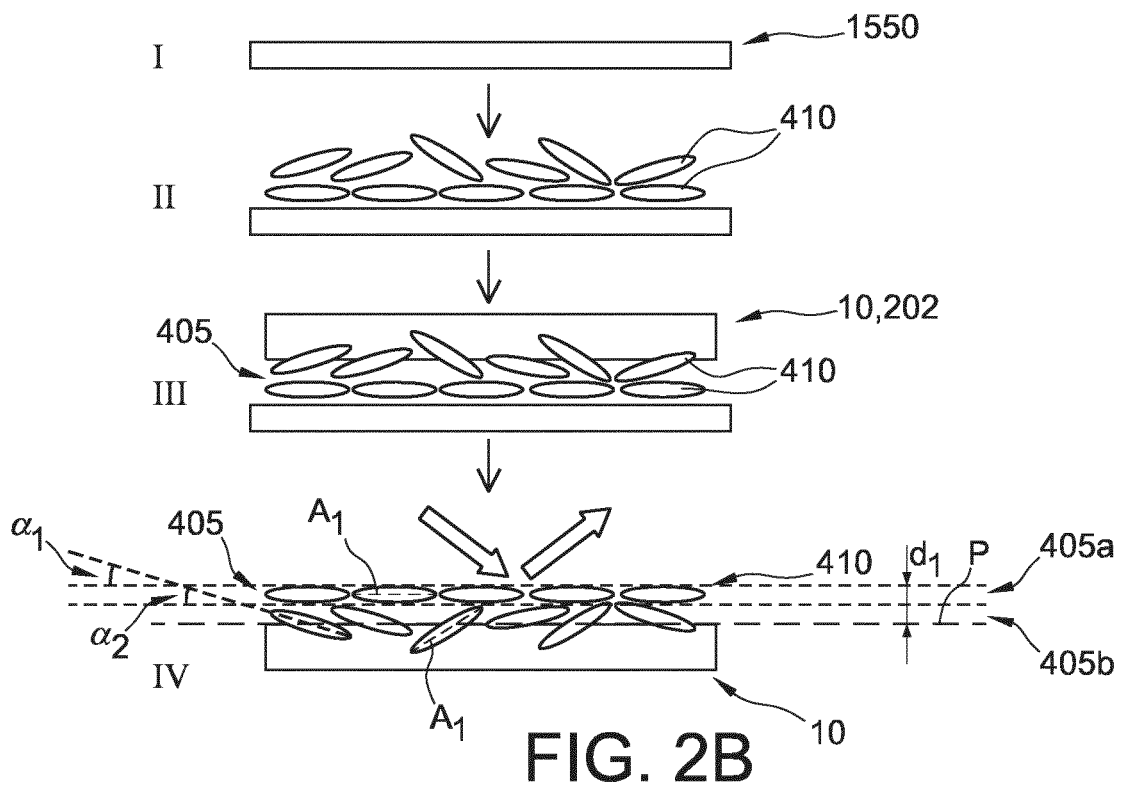

Here, we suggest bringing first a layer of reflective flakes on a smooth substrate (see FIG. 2b) such as aluminum or glass substrate. After bringing the flakes onto a smooth substrate (FIG. 2b: II) an object can then be printed on top of the layer of flakes (FIG. 2b: III). The object is then removed from the substrate and in this way, specularly reflecting decorative surfaces with metallic appearance can be obtained on 3D printed objects as shown in FIG. 2b (IV). Such surfaces can be functional to produce reflectors and collimators. However they can also be just decorative surfaces.

Figure 5A:
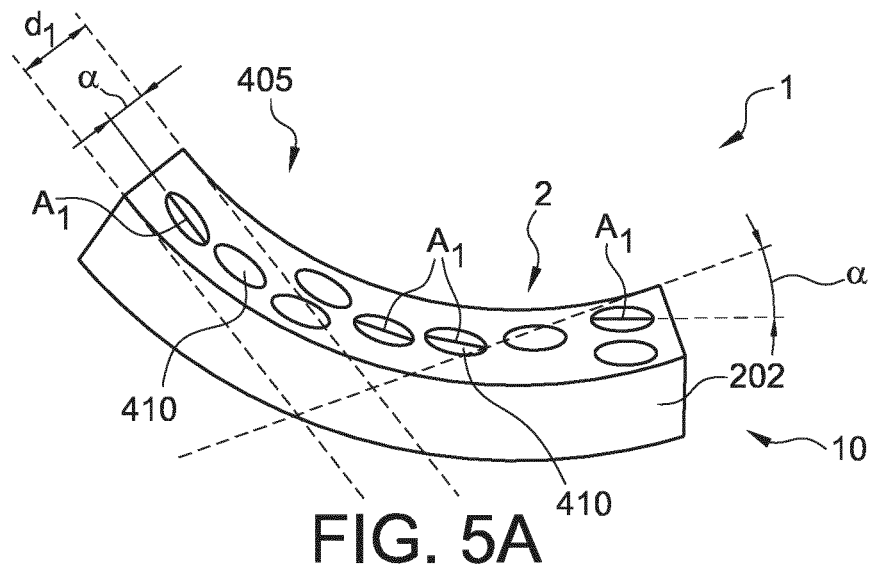
FIGS. 5a-5b schematically depict some applications, including 3D printed items.

With reference to FIG. 2b (IV) and FIG. 5a, it is noted that the particles, more especially the main axis, indicated with reference A1, have an angle α to a tangential plane P. Especially, the average angle is selected from the range of 0-30°. Note that the layer 405 may include one or more regions having in average an angle more parallel to the tangential plane, and one or more regions having in average an angle less parallel to the tangential plane. In the schematic drawing, this is indicated with a first layer region 405a and a second layer region 405b. The upper layer, here 405a, may be most parallel to the tangentional plane. The lowest layer, here 405b, may rest on the 3D printed material 202 or may be partly embedded in the 3D printed material 202, or may essentially be embedded in the 3D printed material 202. Reference d1 indicates the layer thickness, which may e.g. be selected from the range of 5 nm-500 μm.

The reflector may also be used in a lighting system.

Figure 3A:
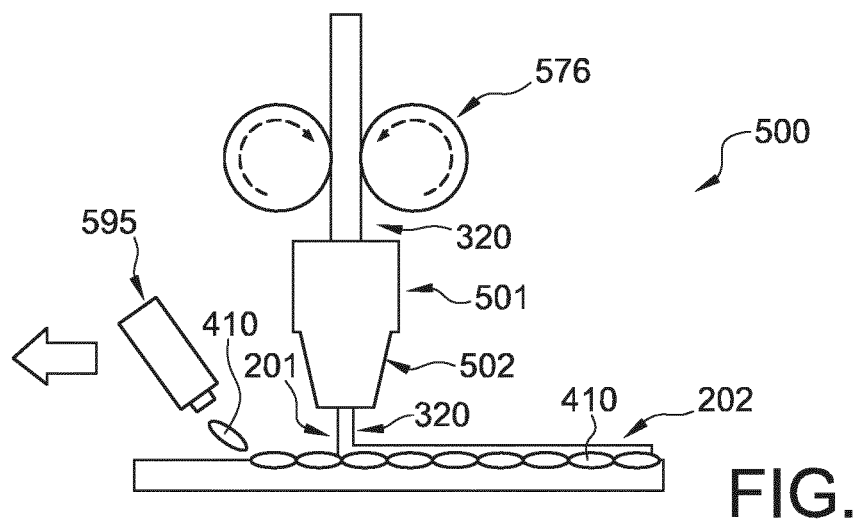
FIGS. 3a-3e schematically depict some embodiments to provide a functional layer for a 3D printed item and/or to provide a 3D printed item.

Referring to FIGS. 1a and 1b, an extra nozzle can be incorporated into the printer for bringing such a layer followed by polymer printing (FIG. 3a).

In yet another embodiment, the 3D printing apparatus comprises two spray coating nozzles for applying different types of flakes to the shaped table, such as in a patterned way.

The flakes are especially specular reflective flakes. Such flakes can be made using various methods including evaporation of an aluminum or silver layer on top of a substrate comprising a release layer (e.g. using physical vapor deposition (CVD) or chemical vapor deposition (PVD)). The release layer can be dissolved in a solution and the evaporated and the evaporated can be cut into small pieces.

The highly specularly reflective particles might (also) comprise a dye. In this way highly reflective colored coatings can be made. The particles might also comprise a dichroic layer. In this way, angle dependent reflection can be obtained. The flakes might also comprise a phosphor material. The particles might also comprise thermal conductive particles. The particles might also comprise electrical conductive particles.

Figure 3B:
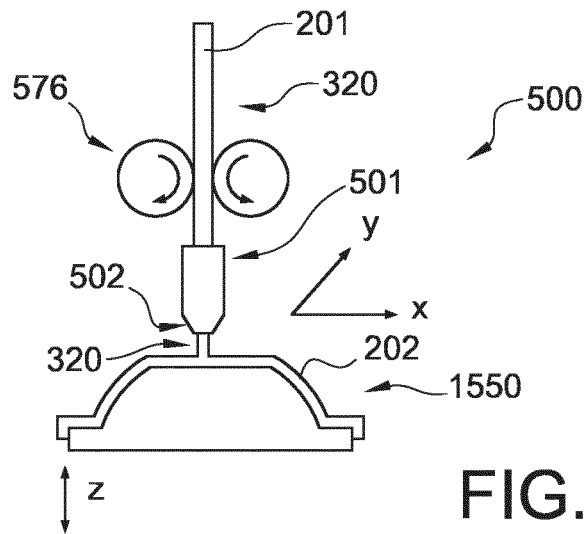

For printing lamps and luminaires, we suggest the use of a smooth reflector shape which is placed on the print platform. The particles can be applied by e.g. spray coating onto the smooth reflector shape. Subsequently, the printer can print on top of such a surface taking over aligned particles (FIG. 3b).

Figure 3C:
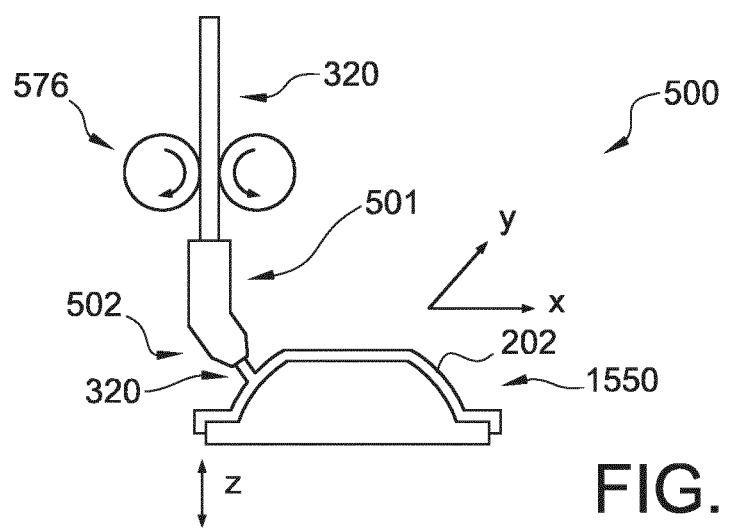

However, currently available printers have a nozzle which is mounted vertically and are too bulky to be a used to fulfill the function described above. For this reason, we propose a printer and printing method where the FDM principle is used but where the printer head is placed at an angle for dispensing on the surface of a smooth reflector shape (FIG. 3c).

Figure 3D:
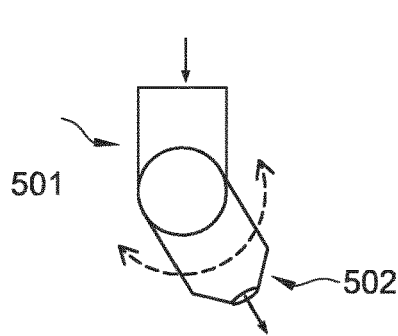

The angle of the printer head might also be adapted according the surface of a smooth reflector shape (FIG. 3d).

Figure 3E:
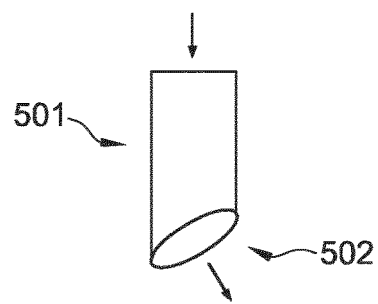

The nozzle might also be shaped such that it is placed vertically, but the nozzle opening is at angle for dispensing on the surface of a smooth reflector shape (FIG. 3e).

In order to take into account that the printer head is always facing the surface to be replicated, we suggest rotating the substrate, the printer head, or the object and printer head during printing. For printing in the z-direction, we suggest moving the stage, the printing head, or the stage and printing head in the z-direction.

The 3-D printer may also comprises a robotic "arm" for picking the 3-D printed product out of the 3-D printer (and putting it on a band or in a box).
In yet another embodiment, the suggested system comprises an inspection/detection means such as a camera.

The printing stage may comprise a clamping means or insert-mechanism for fastening a smooth reflector shape.

Figure 4A:
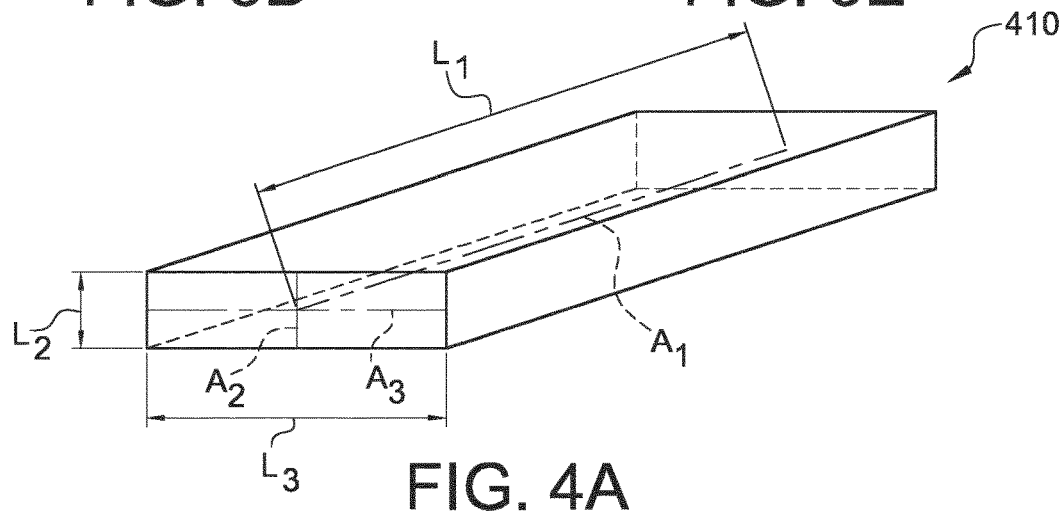
FIGS. 4a-4c schematically depict some aspects of the particles, such as flakes, that can be used herein.
Figure 4B:
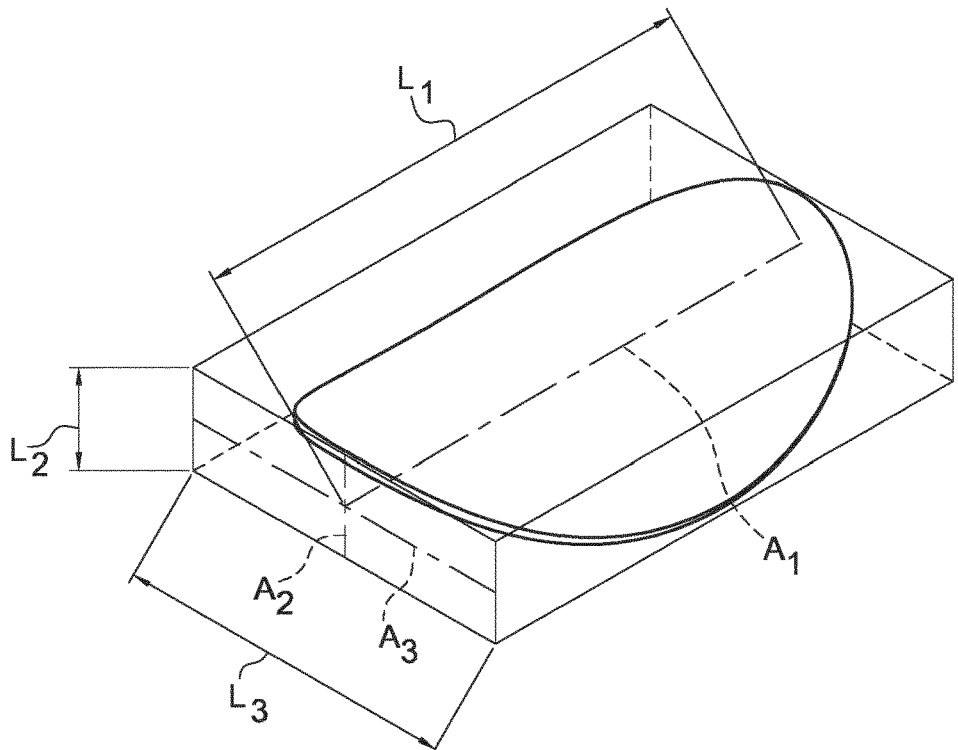
Figure 4C:
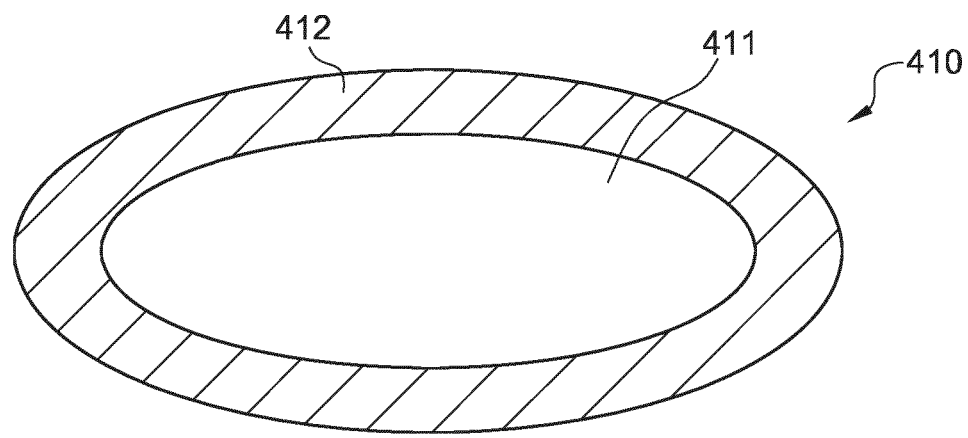

FIGS. 4a-4c schematically depict some aspects of the particles 410. The particles 410 have a main axis A1 having a main axis length L1 and a minor axis A2 having a minor axis length L2. As can be seen from the drawings, the main axis length L1 and the minor axis length L2 have a first aspect ratio larger than 1. FIG. 4a schematically depicts a particle 410 in 3D, with the particle 410 having a length, height and width, with the particle (or flake) essentially having a beam shape. Hence, the particle may have a further (minor or main) axis, herein indicated as further axis A3. Essentially, the particles 410 are elongated thin particles, i.e. L2<L1, especially L2<<L1, and L2<L3, especially L2<<L3. L1 may e.g. be selected from the range of 1-500 μm; likewise L3 may be. L2 may e.g. be selected from the range of 5 nm-10 μm.

FIG. 4b schematically depicts a particle that has a less regular shape, with a virtual smallest rectangular parallelepiped enclosing the particle.

Note that the notations L1, L2, and L3, and A1, A2 and A3 are only used to indicate the axes and their lengths, and that the numbers are only used to distinguish the axis. Further, note that the particles are not essentially oval or rectangular parallelepiped. The particles may have any shape with at least a main axis substantially longer than a minor axis or minor axes, and which may essentially be flat. Especially, particles are used that are relatively regularly formed, i.e. the remaining volume of the fictive smallest rectangular parallelepiped enclosing the particle is small, such as less than 50%, like less than 25%, of the total volume. Such particles are amongst others described in WO2005/057255, which is incorporated herein by reference.

FIG. 4c schematically depicts in cross-sectional view a particle 410 including a coating 412. The coating may be light transmissive and the core of the particle may include reflective material 411. Alternatively or additionally, the coating 412 may comprise light reflective material 411.

Elongate, or flake-like, particles are first prepared. For some applications, particles having large variations in shape and size can be tolerated. Particles without good shape control and having a large distribution of sizes may be produced in several ways. One method is based on the evaporation of a thin layer on top of a substrate having a release coating, followed by its release and reducing to small particle sizes, such as by milling. Other methods include the use of naturally occurring minerals such as mica, which can also be milled. Silicon and aluminum particles may also be produced in solution. However, these particles have random shapes and dimensions. For other applications, particles having a specific size, shape and/or surface property can result in a collimator having a higher performance. Particles may e.g. be provided via the Hall process.

A first method of producing elongate particles may e.g. include the following. This first method may be performed using a variety of techniques such as offset printing, micro contact printing and inkjet printing. In all of these techniques, except for inkjet printing, a patterned surface or a surface to which ink has been transferred in a patterned way (a stamp) is used to transfer ink to another surface comprising a layer to be patterned. The ink may be used as a positive or negative etch resist, depending on the type in ink. If it is used as a negative etch resist, material of the layer to be patterned can be removed selectively by etching from those areas that are not covered or modified by the ink. If the ink is used as a positive etch resist, a second layer of ink providing a higher etch resistance is applied only to the so far unmodified areas of the surface (e. g. by deposition via self-assembly from solution). In this case, in the subsequent etching step, material is removed from those areas that had been modified with the first ink (the areas having the lower etch resistance). Other inking-etching schemes are also possible, including the local (patterned) chemical modification of the ink already deposited on the surface. The layer to be patterned may especially contain a release layer underneath (between the layer to be patterned and a substrate). The release layer can then be dissolved in a suitable solvent, decomposed by a suitable reagent solution, or removed by any other means to leave the free patterned structures (particles, or flakes). The ink may or may not be removed by the solvent, the reagent solution or any other means applied to remove the release layer. If desired, the ink may also be removed in another subsequent processing step. It is also possible to use inkjet printing to produce the desired patterns. In that case the ink can be deposited on top of the layer to be patterned in the form of micro droplets. Further processing will be analogous to the above description.

However, due to its sequential nature, the inkjet printing technique is generally slower.

Optical lithography may also be used to pattern a layer of photoresist material covering the layer to be patterned using a photomask. After development of the resist layer, the layer to be patterned may be etched and particles or flakes are produced in the same way as described above.

A second method of producing elongate particles may e.g. include the following. A mask is used to deposit a layer of particles onto a substrate provided with a release layer. The release layer is then dissolved, thus producing free particles, or flakes. The mask may also be manufactured on top of the substrate. In this case, the particles deposited on top of the mask can be removed using a suitable solvent, thus providing free particles, while the material deposited on an adhesion layer is not removed. It is also possible to use an inverse technique where the deposited material adheres to the mask surfaces and the material deposited between the mask surfaces is released. The mask may also comprise a self-assembled monolayer printed on top of the release layer, thus providing modified areas with substantially different surface properties compared to unmodified areas. In the subsequent deposition step, material may then either be deposited in unmodified areas only, or may be deposited in all areas but be easier to remove from modified areas due to substantially weaker adhesion properties.

The elongate particles, or flakes, may comprise a single layer or several layers of material. The material may be metallic, organic or inorganic. For example, the flakes may comprise a layered dielectric material reflecting a certain band of light. They may alternatively consist of two different layers having different physical (e. g. optical) or chemical surface properties. In a dual layer configuration, one of the layers may be absorbing and the other layer reflecting. It is also possible to combine layers that react with different molecules in different ways. For example, one of the surfaces may be chosen so that it specifically reacts with a polar molecule while the other surface may have a high reactivity with an apolar substance. In this way, particles with specific polar and apolar surfaces can be produced.

The particles, or flakes, may also be surface modified. For example, modification of the two surfaces of a particle having polar and apolar groups, respectively.

Reactive groups may also be attached to the surfaces of particles. Particles having reactive groups may be co-polymerized in a solution containing other reactive molecules and made to become part of a polymeric chain. In this way, stable suspensions of particles can be produced.

Figure 5B:
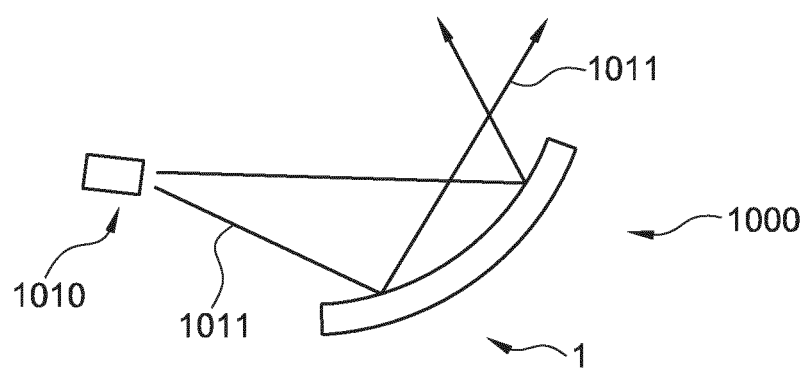

FIG. 5a-5b schematically depict a 3D printed item 10 comprising 3D printed material 202 and a ((specular) reflective) layer 405 on at least part of said 3D printed material 202. The 3D printed material 202 especially comprises a thermoplastic material. The layer 405 comprises particles 410, wherein the particles 410 have a main axis A1 having a main axis length L1, and a minor axis A2 having a minor axis length L2, wherein the main axis length L1 and the minor axis length L2 have a first aspect ratio larger than 1. As shown in the schematic drawing in average the main axes A1 of said particles 410 are configured parallel to a tangential plane P to the reflective layer 405. As indicated above, especially the particles 410 may comprise light reflective material 411. Especially, FIG. 5a schematically depicts a reflector 1 comprising a specular reflective surface 2, wherein the reflector 1 comprises the 3D printed item 10 as described herein, and wherein at least part of the reflective surface 2 is provided by said specular reflective layer 405. Further, FIG. 5b schematically depicts a lighting system 1000 comprising a) a light source 1010 configured to generate light source light 1011 and b) a reflector 1, such as defined above, configured to reflect at least part of said light source light 1011.

In yet another embodiment, the reflector shaped substrate(s) can produce reflectors with 10, 25 and 40 degrees full width half maximum. In an embodiment, the reflector shaped support may thus have the shape and smoothness of a smooth reflector (see e.g. FIG. 6a). In another embodiment, the reflector shaped table might have the shape and smoothness of a faceted reflector. The facets may have areas of larger than 16 mm$^2$, such as in the range of 16-1600 mm$^2$. However, the facets may also be smaller, such as in the range of 1-16 mm$^2$, or even smaller, such as in the range of 0.01-1 mm$^2$. Such fine facets or structures provide smoother beams.

Figure 6A:
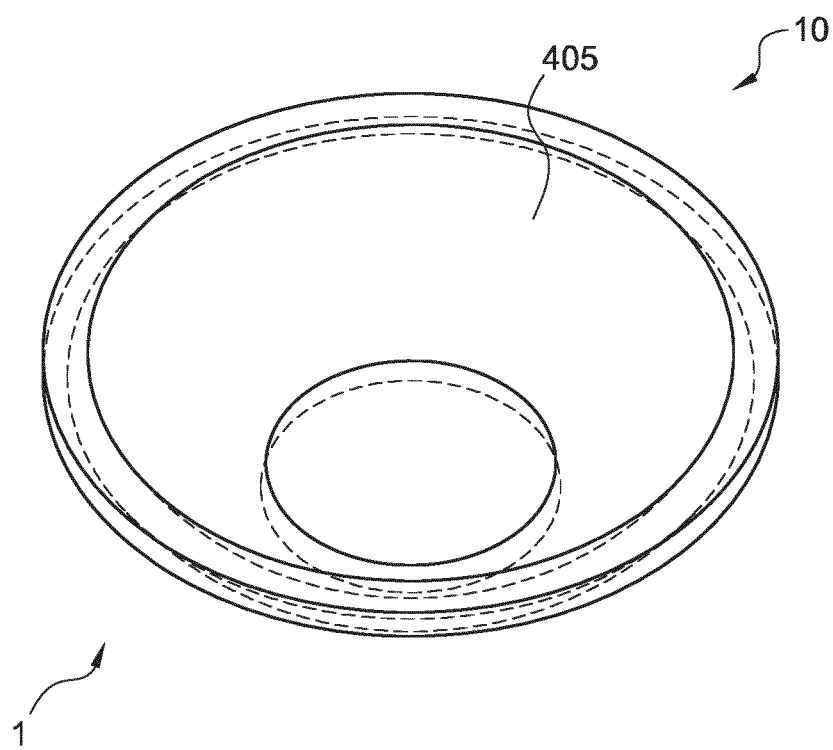
FIGS. 6a-6b schematically depict some possible applications. The schematic drawings are not necessarily on scale.
Figure 6B:
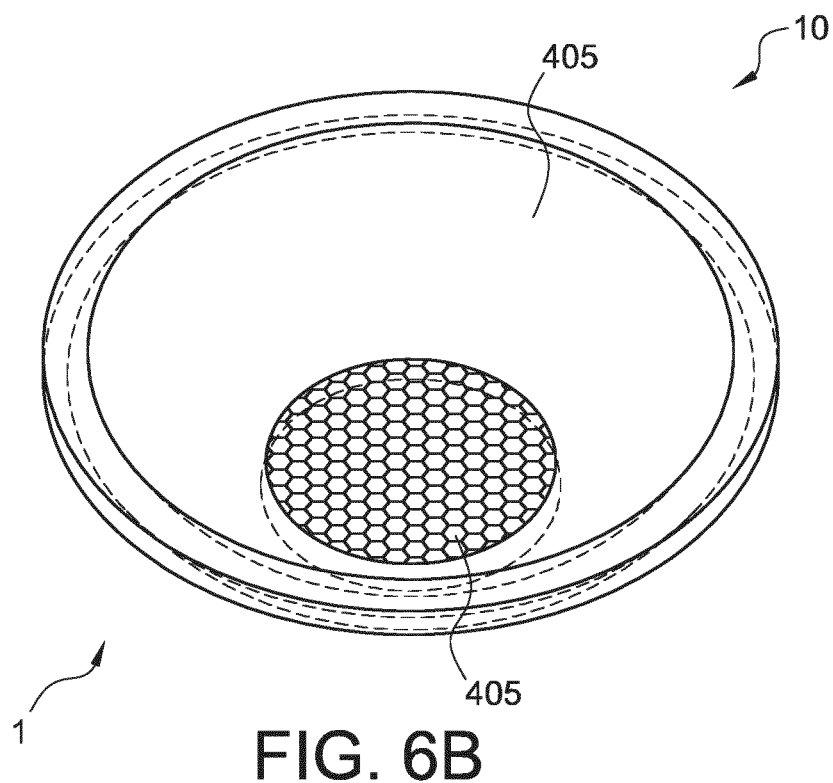

In yet another embodiment, we suggest a reflector shaped table which has a shape and smoothness of a spiral faceted reflector. The fine facets in a tight spiral are desired to achieve a smooth beam. In yet another embodiment, we suggest a reflector shaped table which has a shape and smoothness of a hybrid reflector. It comprises facets near the light source in order to obtain a beam without a "black hole" (see FIG. 6b). More remote from the light source, the reflector may not be facetted. In yet another embodiment, we suggest a reflector shaped table which has a shape and smoothness of an engineered structure including but not limited to including a "textured", "orange peel" and "stochastic" design. Hence, essentially any reflector 1 may include one or more 3D parts comprising the herein described layer 405 having reflective properties. Hence, parts of the reflectors 1 in FIGS. 6a-6b are 3D printed, and include the layer 405.

In an Example, a layer of PVD aluminium flakes (particle thickness 50 nm, particle size 90 μm) was provided on the glass substrate by spray coating aluminium flakes suspended in an organic solvent. After evaporation of the organic solvent, poly carbonate was 3D printed on the glass substrate comprising the layer of PVD aluminium flakes. The 3D printed object was cooled down and almost all of the flakes came off the glass substrate on top of the object obtaining a specular reflecting layer.

The term "substantially" herein, such as "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

It goes without saying that one or more of the first (printable or printed) material and second (printable or printed) material may contain fillers such as glass and fibers which do not have (to have) influence on the on $T_g$ or $T_m$ of the material(s).

The invention claimed is:

1. A method for 3D printing a 3D item, the method comprising providing a filament of 3D printable material and printing during a printing stage said 3D printable material on a substrate, to provide said 3D item, wherein the printing stage comprises:
   (a) providing a layer comprising particles on the substrate, and
   (b) printing said 3D printable material on said layer on the substrate to provide said 3D item comprising said layer, wherein each particle has a main axis (A1), a minor axis (A2) and a further axis (A3), the main axis (A1), the minor axis (A2), and the further axis (A3) defining a rectangular parallelepiped with a smallest volume that encloses the particle,
   wherein the main axis (A1) has a main axis length (L1), the minor axis (A2) has a minor axis length (L2), and the further axis (A3) has a further axis length (L3),
   wherein the main axis length (L1) and the minor axis length (L2) have a first aspect ratio of at least 5,
   wherein the further axis length (L3) and the minor axis length (L2) have a second aspect ratio of at least 5, and
   wherein said particles comprise light reflective material.

2. The method according to claim 1, wherein the particles have a first aspect ratio of at least 10, and wherein the layer has a layer thickness (d1) selected from the range of 5 nm-200 μm.

3. The method according to claim 1, wherein the particles have main axis lengths (L1) selected from the range of 1-500 μm and minor axis lengths (L2) selected from the range of 5 nm-10 μm, and wherein at least 80% of a surface area of the layer has a root mean square surface roughness of at maximum 25 nm.

4. The method according to claim 1, wherein the main axes (A1) of said particles have an angle (α) to a tangential plane (P) to the substrate selected from the range of 0-30°.

5. The method according to claim 1, wherein the particles comprise one or more of metal particles and inorganic and organic particles, and wherein the particles comprise a light reflective coating.

6. The method according to claim 1, wherein the substrate has the shape of a reflector with one or more of a curved face, a facetted face, and faces configured relative to each under an angle.

7. A 3D printed item comprising 3D printed material and a specular reflective layer on at least part of said 3D printed material, wherein the 3D printed material comprises a thermoplastic material, wherein the specular reflective layer comprises particles, wherein each particles has a main axis (A1), a minor axis (A2) and a further axis (A3), the main axis (A1), the minor axis (A2), and the further axis (A3) defining a rectangular parallelepiped with a smallest volume that encloses the particle, wherein the main axis (A1) has a main axis length (L1), the minor axis (A2) has a minor axis length (L2), and the further axis (A3) has a further axis length (L3), wherein the main axis length (L1) and the minor axis length (L2) have a first aspect ratio of at least 5, wherein the further axis length (L3) and the minor axis length (L2) have a second aspect ratio of at least 5, and wherein said particles comprise light reflective material.

8. The 3D printed item according to claim 7, wherein the particles have a first aspect ratio of at least 10, wherein the layer has a layer thickness (d1) selected from the range of 5 nm-2 mm, wherein the particles have main axis lengths (L1) selected from the range of 1-500 μm and minor axis lengths (L2) selected from the range of 5 nm-1 μm, and wherein at least 80% of a surface area of the layer has a root mean square surface roughness of at maximum 25 nm.

9. The 3D printed item according to claim 7, wherein the main axes (A1) of said particles have an angle (α) to a tangential plane (P) to the substrate selected from the range of 0-30°, and wherein the particles comprise one or more of metal particles and white particles.

10. A reflector (1) comprising a specular reflective surface (2), wherein the reflector (1) comprises the 3D printed item (10) according to claim 7, and wherein at least part of the reflective surface (2) is provided by said specular reflective layer.

11. The reflector (1) according to claim 10, wherein the reflective surface (2) comprises one or more of a curved face, a facetted face, and faces configured relative to each under an angle.

12. The reflector (1) according to claim 10, wherein the reflector (1) is a collimator or a parabolic mirror.

13. A lighting system comprising (a) a light source configured to generate light source light and (b) a reflector (1) according to claim 10 configured to reflect at least part of said light source light.

* * * * *